US012449101B2

(12) United States Patent
Waldemeyer

(10) Patent No.: US 12,449,101 B2
(45) Date of Patent: Oct. 21, 2025

(54) ELECTRO-OPTICAL DEVICE FOR DISPLAYING A FIRE FLAME

(71) Applicant: Moritz Waldemeyer, London (GB)

(72) Inventor: Moritz Waldemeyer, London (GB)

( * ) Notice: Subject to any disclaimer, the term of this patent is extended or adjusted under 35 U.S.C. 154(b) by 0 days.

(21) Appl. No.: 18/638,968

(22) Filed: Apr. 18, 2024

(65) Prior Publication Data

US 2024/0426436 A1 Dec. 26, 2024

(30) Foreign Application Priority Data

Jun. 26, 2023 (IT) ........................ 102023000013146

(51) Int. Cl.

| | |
|---|---|
| ***F21K 9/232*** | (2016.01) |
| ***F21S 10/04*** | (2006.01) |
| ***F21V 3/02*** | (2006.01) |
| ***F21Y 115/10*** | (2016.01) |
| *F21Y 105/16* | (2016.01) |

(52) U.S. Cl.

CPC ............ *F21K 9/232* (2016.08); *F21S 10/043* (2013.01); *F21V 3/02* (2013.01); *F21Y 2105/16* (2016.08); *F21Y 2115/10* (2016.08)

(58) Field of Classification Search

CPC ...... H05B 45/00; H05B 45/44; H05B 47/155; H05B 47/165; G09F 9/33; G09G 3/32; F21K 9/232; F21S 10/043; F21V 3/02; F21Y 2105/16; F21Y 2115/10

See application file for complete search history.

(56) References Cited

U.S. PATENT DOCUMENTS

| | | | | |
|---|---|---|---|---|
| 10,344,930 | B1 * | 7/2019 | Mitchell, Jr. | F21K 9/23 |
| 2014/0062316 | A1 * | 3/2014 | Tischler | H05K 1/00<br>315/185 R |
| 2015/0369431 | A1 * | 12/2015 | Li | H05B 45/00<br>362/249.1 |
| 2016/0109083 | A1 * | 4/2016 | Li | F21V 23/0407<br>362/277 |
| 2018/0033358 | A1 * | 2/2018 | Patton | G09G 3/008 |
| 2018/0135821 | A1 * | 5/2018 | Wei | F21K 9/238 |
| 2018/0163937 | A1 * | 6/2018 | Lee | G09G 3/2085 |
| 2018/0283633 | A1 * | 10/2018 | Roberts | H05B 47/155 |
| 2022/0128200 | A1 * | 4/2022 | Halliwell | F21K 9/232 |

* cited by examiner

*Primary Examiner* — Tracie Y Green
(74) *Attorney, Agent, or Firm* — Law Office of Sam Sokhansanj PLLC

(57) ABSTRACT

A light bulb having an electro-optical device for displaying a dynamically moving fire flame. The electro-optical device can include a housing, wherein the housing is at least partially transparent and a plurality of photoemitters arranged and disposed within the housing in a grid or matrix configuration. In addition, the electro-optical device can include a controller in communication with the plurality of photoemitters, wherein the controller is configured to transmit a control signal to at least a first portion of the photoemitters in order to cause the display of the fire flame. Here, each of the plurality of photoemitters may include at least one layer of phosphor, wherein the at least one layer of phosphor is disposed within the housing. In addition, the plurality of photoemitters can each include at least one semiconductor photoemitter such as a light emitting diode (LED).

20 Claims, 4 Drawing Sheets

ELECTRO-OPTICAL DEVICE FOR DISPLAYING A FIRE FLAME

CROSS REFERENCE TO RELATED APPLICATION

This application claims the benefit of Italian Patent Application No. 102023000013146 filed on Jun. 26, 2023, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Generally, conventional light bulbs or LED light bulbs lack any distinctive character or visual stimulation to an observer. For example, some LED light bulbs may provide various types of RGB lighting patterns and some may pulse in operation. It is generally well known that a candle or fire flame can generate a certain mood, color, tone, aesthetic, and visual stimulation to a room. However, it is generally inconvenient to operate candles or any fire type of flame, as the candle wax, wick, or wood can dissolve and disintegrate in a few hours. In addition, as is well known, a fire flame in a room can also pose various potential fire risks.

Hence, what is needed is a light bulb that can mimic a moving candle or fire flame, and wherein the light bulb can operate using any standard light electrical socket and be further used in any type of installation or fixture, such as within a lamp, chandelier, or ceiling, among others, and can provide aesthetic and visually pleasing stimulation to an observer.

BRIEF SUMMARY

In one non-limiting exemplary embodiment of the disclosure described herein, a light bulb having an electro-optical device that can mimic a moving candle or fire flame is disclosed, and wherein the light bulb can operate using any standard light electrical socket and be further used in any type of installation or fixture, such as within a lamp, chandelier, or ceiling, among others, and can provide aesthetic and visually pleasing stimulation to an observer, among other advantages. Here, the electro-optical device for displaying a fire flame can include a housing, wherein the housing is at least partially transparent; a plurality of photoemitters arranged and disposed within the housing in a grid or matrix configuration; and a controller in communication with the plurality of photoemitters, wherein the controller is configured to transmit a control signal to at least a first portion of the photoemitters in order to cause the display of the fire flame. Here, the each of the plurality of photoemitters may include at least one layer of phosphor, wherein the at least one layer of phosphor is disposed within the housing. In addition, the plurality of photoemitters can each include at least one semiconductor photoemitter. Further, the plurality of photoemitters can each be a light emitting diode (LED). Also, the housing can include a first layer integrated with and in contact with a substrate disposed within the housing, and wherein the first layer can be at least partially transparent. Further, the housing can further include a second layer integrated with an in contact with the substrate, wherein there second layer is at least partially transparent.

In addition, the first layer can be disposed on a first side of the substrate and the second layer can be disposed on a second opposing side of the substrate. Also, the device can include a plurality of circuits disposed within the housing and adapted to operate an activation or de-activation of one or more of the plurality of photoemitters. Here, the plurality circuits can be adapted to feed electrical signals or power to at least a group of four photoemitters. Further, each of the plurality of circuits can be disposed on one side of each of the plurality of photoemitters, and wherein each of the plurality of circuits can be co-planar with respect to each of the photoemitters. Further, the controller can be adapted to receive and process an address string to activate or deactivate one or more of the plurality of photoemitters.

Here, the address string can include a first part identifying a first circuit from the plurality of circuits; and a second part comprising at least one identifier of a first photoemitter of the plurality of photoemitters, wherein the controller is configured to enable or activate the first circuit via the first part of the address string, and activate or deactivate the first photoemitter of the plurality of photoemitters connected to the first circuit via the second part. In addition, the at least one layer of phosphor can be substantially superimposed on each of the plurality of photoemitters along at least a first main direction of radiation of at least one photoemitter of the plurality of photoemitters. Further, the phosphor layer can be a discontinuous layer and can further define a plurality of independent isles embedding a respective photoemitter of the plurality of photoemitters and wherein the at least one phosphor layer extends into a first layer or a second layer of the housing. Also, the substrate is can be a printed circuit board having a plurality of tracks or channels for electrically feeding the plurality of photoemitters and wherein the device can further include a plurality of switches operatively connected to the controller data processing unit and adapted to selectively activate or deactivate in order to display the fire flame via the plurality of photoemitters.

In addition, the controller can be configured to display a time-variant moving image of the fire flame, wherein a control signal from the controller causes an activation or deactivation of a plurality of switches of one or more driving circuits in a time-variant way for determining a showing of the time-variant moving image of the fire flame. Here, the controller can be adapted to control a radiation intensity of the plurality of photoemitters. Further, the housing can be disposed within a light bulb including an electrical socket adapted to receive electrical power.

In another non-limiting exemplary embodiment of the present disclosure described herein, an electro-optical device for displaying a moving image of a flame. The device can include a casing, wherein the casing is at least partially translucid; a plurality of light-emitting diodes (LEDs) arranged and disposed within the casing in a grid or matrix configuration; and a control unit in communication with the plurality of LEDs, wherein the control unit is configured to transmit a control signal to active or deactivate the plurality of LEDs such that a moving image of the flame is displayed within the casing.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
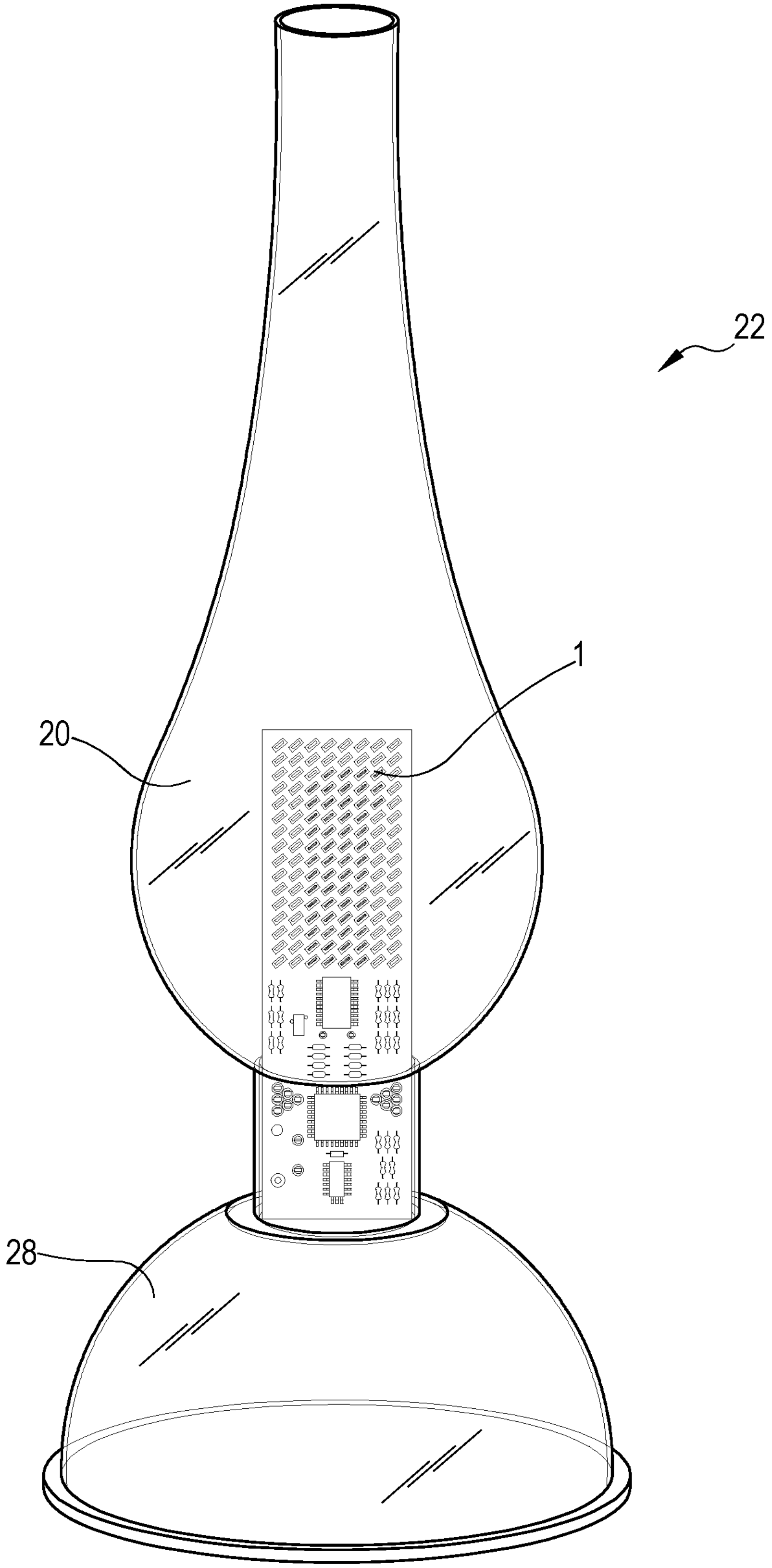
FIG. 1 illustrates a perspective view of a lighting device of the disclosure described herein, according to one non-limiting exemplary embodiment.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Any discussion of a computing device or mobile device may also apply to any type of networked device, including but not limited to mobile devices and phones such as cellular phones (e.g., an iPhone®, Android®, or any "smart phone"), a personal computer, iPad®, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "code", "application", "app", and "firmware" may include any non-transitory computer readable medium storing thereon a program, which when executed by a computer or controller, causes the computer or controller to perform a method, function, or control operation.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

FIGS. 1-5 illustrate one or more non-limiting embodiments for an electro-optical device 1 disposed within and/or operating as a light bulb 20 of a table-top lamp 22 provided with a base 28. Here, the electro-optical device 1 can include an electrical component and an optical component, wherein the optical component can be powered by the electrical component. As shown, device 1 is adapted to show an image or silhouette of a static or dynamically moving fire flame or candle flame 5. In addition, at least one frame, bracket, casing, housing, or support 2 is provided for operatively supporting a plurality of light emitting diode (LED) photoemitters 3. In addition, photoemitters 3 arranged on said support 2 in a predefined and reciprocal spatial configuration or grid-like configuration. Further, a computing device, control unit, controller, or data processing unit 4 can be operatively connected to a plurality of photoemitters 3 and in communication therewith. Here, the data processing unit 4 can transmitting a control signal destined to activate at least a first portion of said photoemitters 3 to cause the showing of said flame image 5. Preferably, but in a non-limiting extent, the data processing unit 4 can be configured to cause a showing of a time-variant image 5, in particular a dynamically moving flame. The motion of the flame may simulate the effect of the wind or air blowing against it, typically translating the tip portion of the flame and distorting the overall shape thereof. Such effect may result in an actually effective simulation of a living or live flame. Further, the predefined and reciprocal spatial configuration of the photoemitters 3 can be in a fixed configuration, meaning that no photoemitter can move with respect to another one.

Data Processing Unit

Here, the controller, control unit, and data processing unit 4 can be an electronic device or computing device capable of managing relatively complex data in such a way to control independently activation, deactivation and, should the case may be, intensity of radiation of at least one and preferably a plurality of photoemitters 3, by means of a direct or indirect addressing thereof. In addition, the data processing unit 4 may include at least one general-purpose processor; alternatively or in combination, data processing unit 4 may comprise at least one specific type processor, i.e. an ASIC. Further, alternatively or in combination, the data processing unit 4 may include an FPGA or a logic programmable controller configured to perform the controlling procedures which are disclosed in the present disclosure. Also, the data processing unit 4 may be provided with an internal memory and/or may be electrically connected to an external memory. On such memory, either external and/or internal, may be stored a computer program. The computer program comprises software code portions that are run by the data processing unit 4 can allow the showing of the image 5. Software code portions may be written in any language and may be stored in an executable file or in any other type of file. As it will be apparent after a full reading of the present description, the software program comprises software code portions that when executed by the data processing unit 4 cause a transmission of a time-variant control signal so that, in time, a second portion of the plurality of photoemitters 3, at least partially differing from a first portion of said plurality of photoemitters 3, is activated in alternative to said first portion of the plurality of photoemitters 3 for showing said image 5.

Referring to FIGS. 2-5, in one embodiment, the support 2 can be a substantially thin-shaped layer (precisely, multi-layer) element. The support 2 is preferably planar but such technical feature shall not be intended as limiting. Indeed, the support 2 may assume a curved shape. In an embodiment, the support 2 is at least partially substantially translucid. More in particular, support 2 may be made of a substrate 6 that is at least partially or substantially translucid, translucent, or transparent. For the purposes of the present disclosure, "translucid" means capable of allowing the transmission of optical radiation, preferably within the visible spectrum, with a rate of attenuation between 0% (full transparency) and $100\%-\varepsilon$, $\varepsilon \neq 0$ 10) (substantially full opacity), preferably 99.5% or 99% or 98.5%. In addition, substrate 6 of support 2 can serve as a main structural layer of the support and which may have a thickness greater than the thickness of the further layers which are part of the support 2. Also, support 2 can include a first coating layer. The first coating layer 7 can substantially cover and be integrated with the substrate 6 and is also substantially translucid, translucent, or transparent. In one embodiment, the first coating layer 7 covers uninterruptedly the substrate 6. In another embodiment, the substrate 6 can be a substantially thin-shaped layer (precisely, multi-layer) substrate. The substrate 6 can preferably be planar but such technical feature shall not be intended as limiting. Indeed, the substrate 6 may assume a curved shape.

Figure 2:
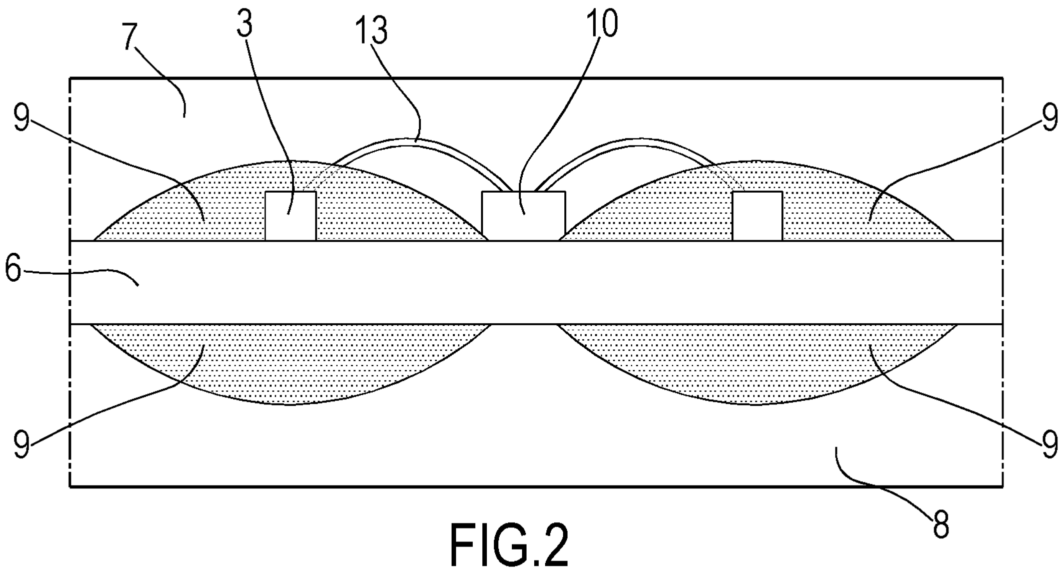
FIG. 2 illustrates a partial cross-sectional view of an electro-optical device of the disclosure described herein, according to one non-limiting exemplary embodiment.
Figure 3:
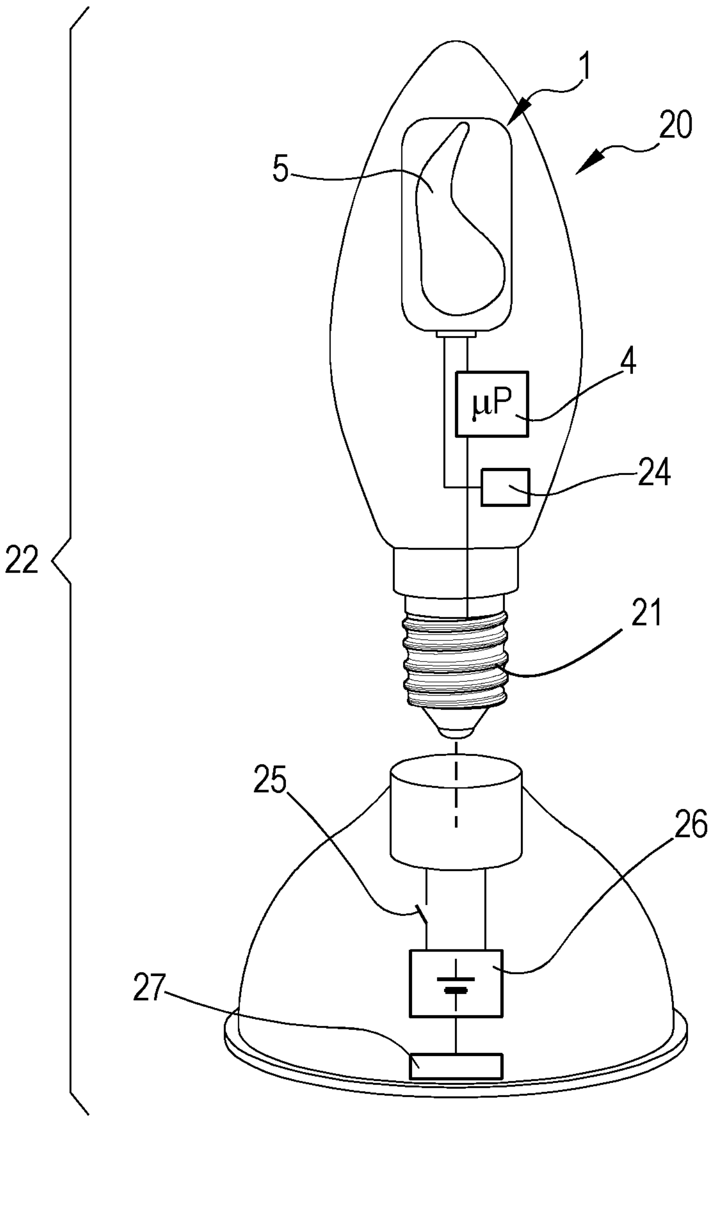
FIG. 3 illustrates a perspective view of a lighting device of the disclosure described herein, according to one non-limiting exemplary embodiment.
Figure 4:
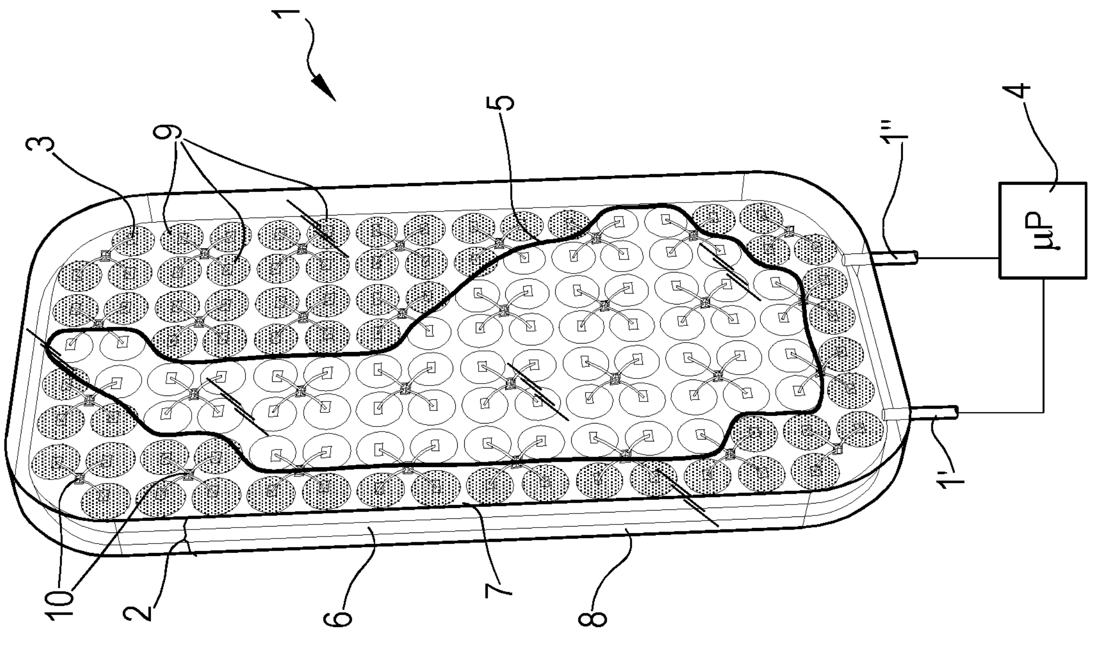
FIG. 4 illustrates a perspective view of the electro-optical device of the disclosure described herein, according to one non-limiting exemplary embodiment.

Still referring to FIGS. 2-5, the substrate 6 and said first coating layer 7 can be in reciprocal direct contact. Here, the first coating layer 7 may be a thin-shaped layer and may be substantially planar or may assume a curved shape that matches the shape of the substrate 6 in order to not be kept aligned and in contact thereto. Further, support 2 may include a second coating layer 8, such as shown in FIG. 4 in one non-limiting exemplary embodiment. Here, the second coating layer 8 covers substantially integrally said substrate 6 and is a substantially translucid, translucent, or transparent coating layer. In an embodiment, the second coating layer 8 can substantially cover substrate 6 uninterruptedly. Preferably, in the embodiment where substrate 6 includes a second coating layer 8, the substrate 6 and said second coating layer 8 are in reciprocal direct contact with each other. Here, the second coating layer 8 may be a thin-shaped layer and may be substantially planar or may assume a curved shape that matches the shape of the substrate 6 in order to not be kept aligned and in contact thereto.

Referring to FIG. 4, an embodiment of the first coating layer 7 is shown arranged on a first side of said substrate 6 and said second coating layer 8 is arranged on a second side of said substrate 6. The first side may be considered a front side of the substrate 6 or a front side of the electro-optical device 1, while the second side may be considered a rear side of the substrate 6 or a rear side of the electro-optical device 1. The first and the second side are opposite one another. It appears thus clear that the substrate 6 can be the result of the integration said first coating layer 7 and said second coating layer 8. Here, the translucency of the support 2 provides good visibility of the photoemitters 3 from a wide solid angle of observation. Further, having at least the first coating layer 7 and the second coating layer 8 provided with a substantially translucid property may contribute to the visibility of the image 5 at least from the two opposite sides (or from either side) of the electro-optical device 1. This is in particularly true when the substrate 6 is translucid. Accordingly, the foregoing avoids the need for duplicating the number of photoemitters 3 such they are both sides of support 2. In particular, when the substrate 6 is translucid, an optical radiation scattering provided by the phosphors layer may cause an illumination directed also through the substrate 6 to the side where the second coating layer 8 may be present.

Still referring to FIGS. 2-5, the reciprocal spatial arrangement of the overall assembly having the substrate 6, the first coating layer 7 and the second coating layer 8 can determine a visibility of said image 5 at least from a first range of directions (and viewing angles) and from a second range of directions (and viewing angles), the second range of directions (and viewing angles) being opposed with respect to said first range of directions (and viewing angles). While the following technical feature should not be considered as limiting, in a preferred embodiment, the support 2 is substantially rigid. For the purposes of this disclosure, "substantially rigid" is defined as a body that is intended not to flex substantially due to its own weight, particularly regardless of its spatial orientation with respect to the force of gravity. In particular, at least substrate 6 is substantially rigid. In such a case, the first and/or second coating layer may be substantially flexible. Alternatively, the substrate 6 and the first coating layer 7, or the substrate 6 and the second coating layer 8, are both substantially rigid. Still alternatively, the substrate 6, the first coating layer 7, and the second coating layer 8 are all substantially rigid. Still alternatively, the first coating layer 7 and/or the second coating layer 8 is, or are, substantially rigid. In such a case, it may be the substrate 6 that is substantially flexible. In an embodiment, the thickness of at least one among the substrate 6, the first coating layer 7 and the second coating layer 8 is kept constant. This means that in one embodiment the support 2 may have a constant thickness.

Still referring to FIGS. 2-5, at least a part of the support 2 is electrically non-conductive, i.e. it is made of an insulating material. In particular, it may be preferable that the substrate 6 be made of an insulating material, in such a way to avoid the need of interposing an insulating layer separating it from the photoemitters 3. Preferably, also each of the coating layers can be insulating. In one non-limiting exemplary embodiment, at least one of the first coating layer 7 or the second coating layer 8 are made of an optically diffusing material. Here, an optically diffusing material may be a material that diffuses, i.e. scatters, an optical radiation in some manner to transmit a radiation whose direction or propagation may be distributed, in terms of power per solid angle, in a more distributed way with respect to a non-diffused radiation, having in contrast a radiation propagation direction which is relevantly more concentrated. Theoretically, a perfect (reflecting) diffuser (PRD) is a perfectly white surface with Lambertian reflectance. In other words, its brightness appears the same from any angle of view. Such diffuser may not absorb light, giving back 100% of the light it receives. Further, the first coating layer 7 or the second coating layer 8 may be manufactured or made of a glass-type material and/or in a polymeric material. In one non-limiting exemplary embodiment, the polymeric material may be an epoxy resin or a silicone-type plastic material, or polycarbonate, or PE, or PP or PMMA. Nothing in the present description may be considered as limiting the first coating layer and the second coating layer to be made with the same material or having the same optical properties; in fact, e.g. the first coating layer 7 may be manufactured with a material differing from the second coating layer 8, and/or the first coating layer 7 may be substantially diffusing while the second coating layer 8 may not, or vice versa.

Photoemitters

Preferably, albeit in a non-limiting extent, the photoemitters can be semiconductor-type photoemitters. In one embodiment, such photoemitters are LEDs. It is herewith considered that in an embodiment, not all the photoemitters of said plurality of photoemitters may be of a same type; indeed, for instance, at least part of the photoemitters 3 may be of a first type, while the other part of the photoemitters 3 may be of a second type. LEDs may be traditional inorganic LEDs, or alternatively or in combination, may be organic LEDs (OLEDs) and in particular may be plastic organic LEDs. In an embodiment, at least part of said LEDs may be graphene-type LEDs. Further, the photoemitters 3 may be configured to radiate within the visible spectrum. For the purposes of the present disclosure, a radiation within the "visible spectrum" is a radiation whose wavelength is substantially within the range 390-740 nm, or whose frequency is substantially within the range 405-770 THz. In another embodiment, the photoemitters 3 may be configured to radiate within the infrared and/or ultraviolet spectrum. Further, the radiation within the "infrared spectrum" can be radiation whose wavelength is substantially within the range of $740\text{-}1\times10^6$ nm, or whose frequency is substantially within the range of 0.3-405 THz. Also, the radiation within the "ultraviolet spectrum" is a radiation whose wavelength is substantially within the range of 10-390 nm, or whose frequency is substantially within the range of $770\text{-}3\times10^4$ THz.

Figure 5:
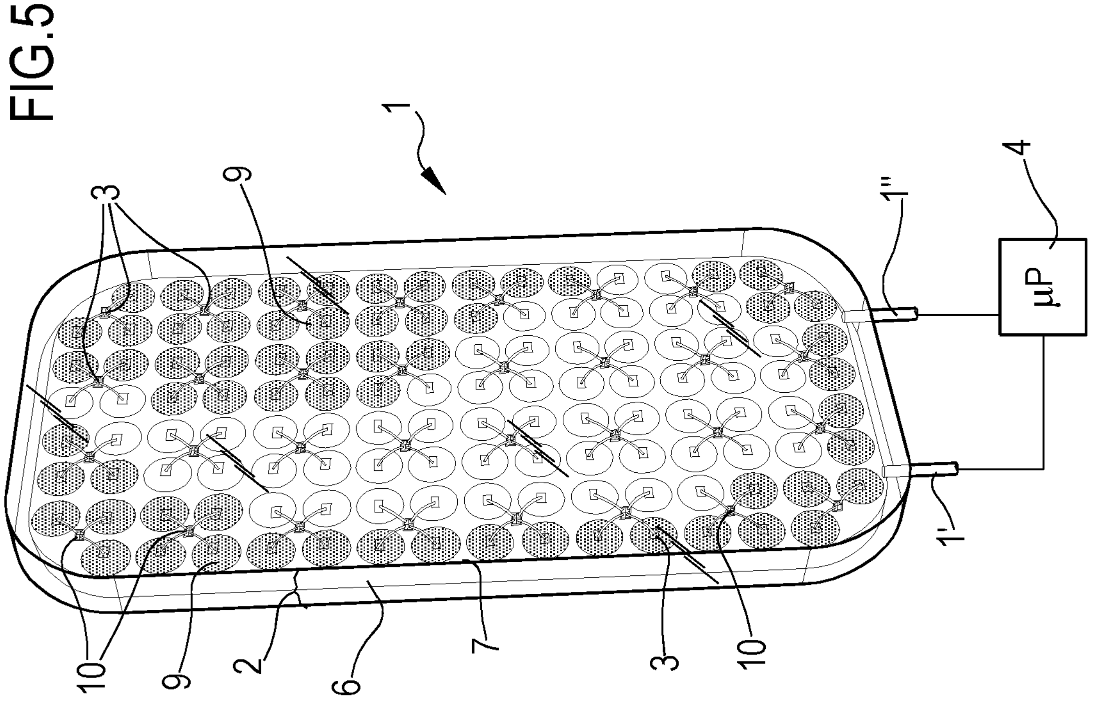
FIG. 5 illustrates another perspective view the electro-optical device of the disclosure described herein, according to one non-limiting exemplary embodiment.
Figure 6:
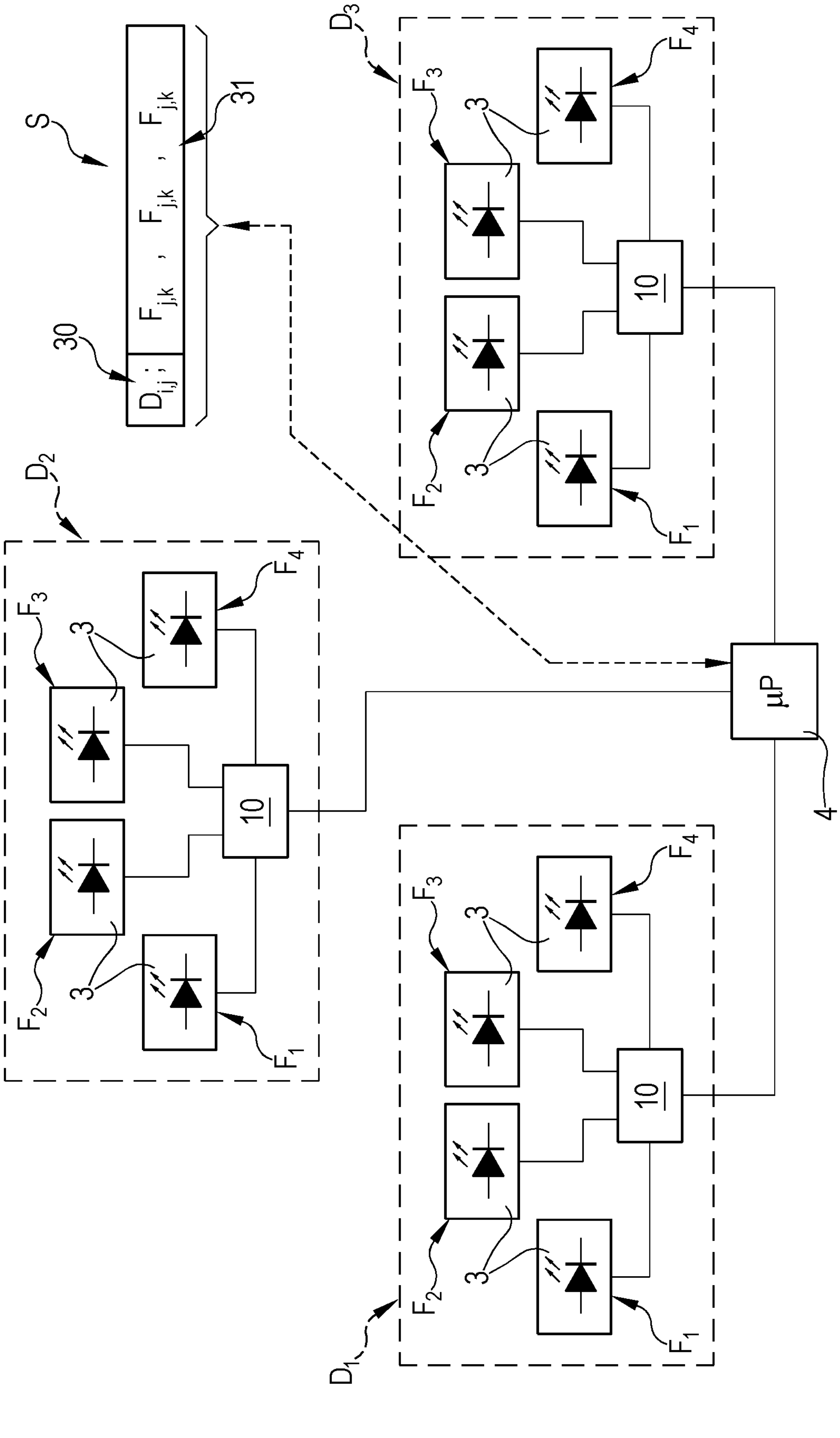
FIG. 6 illustrates a schematic diagram of one or more driving circuits of the electro-optical device of the disclosure described herein, according to one non-limiting exemplary embodiment.

Referring to FIGS. 2-6, in one embodiment, at least part of the photoemitters 3 may have a main direction of radiation. In the main direction of radiation the luminous flux can be at its highest. Such direction is identified by identifier D1, such as shown in FIG. 6. Preferably, but in a non-limiting extent, such main direction of radiation is substantially orthogonal to the plane of the support 2. In one embodiment, which may be combined with one or more of the previous embodiments, the photoemitters 3 may be tunable in frequency or, equivalently in wavelength. In such case, a control signal thereof may include a component allowing the device or a user to select, in a time-variant way, and preferably without needing to de-power the photoemitter 3, a specific frequency or wavelength of radiation. Further, the technical feature of tenability of a photoemitter 3 may be present within the limits of a given spectrum, i.e. within the limits of the visible spectrum, or within the limits of the ultraviolet spectrum or within the limits of the infrared spectrum, or may cross the limits of a given spectrum; thus in an embodiment, which is non-limiting, the photoemitters 3 may be tunable in such a way to radiate within the visible spectrum and up to, and included, the ultraviolet spectrum.

Referring to FIGS. 2-6, in one embodiment, the photoemitters 3 can be in a form of LED dies. Here, such LED may be considered COB (Chip-on-board) LEDs. Further, albeit this technical feature may not be considered limiting, the photoemitters 3 may be configured in such a way to allow controlling their intensity of radiation. In such an embodiment, the plurality of photoemitters 3 can be controllable in radiation intensity between at least a first value of radiation intensity I1 and a second value of radiation intensity I2. Preferably, the first radiation intensity I1 and the second radiation intensity I2 are different from zero. Further, the control signal can be destined to activate at least a first portion of said plurality of photoemitters 3 and to determine a temporal variation of intensity of radiation for at least part of said first portion of said plurality of photoemitters 3 for causing the showing of said image 5. In addition, should a time-variant image 5 be represented, it may be preferably that the photoemitters 3 are of a low-latency type. In a preferred embodiment, low-latency photoemitters may have a turn-on and/or a turn-off time less than 1 ms, preferably less than 0.5 ms. Further, extremely low-latency LEDs may have turn-on and/or turn-off times less than or equal to 100 ns.

In addition, in one non-limiting exemplary embodiment, in case of the photoemitters 3, and in particular the LEDs that emit radiation within the visible spectrum, such photoemitters 3 may emit a substantially white visible radiation. Here, nothing in the present description may be interpreted in such a way to limit the type of the photoemitters 3 to be of a single type, and/or of a single size or shape. Albeit preferably all the photoemitters 3 being part of said plurality of photoemitters 3 may be of a same type, e.g. white LEDs, and may be of a same size and shape (e.g. squared), Applicant has conceived embodiments (not shown in the annexed figures for brevity) wherein at least a sub-part of said plurality of photoemitters 3 of the overall plurality of photoemitters 3 is of a first type (white LEDs) and at least a further sub-part of said plurality of photoemitters 3 of said overall plurality of photoemitters 3 is of a second type (e.g. orange, amber, or yellow LEDs). As well, in alternative or in combination with the above, the photoemitters of a sub-part of the overall plurality of photoemitters 3 may be of a first smaller size, and/or be of a first shape, and the plurality of a further sub-part of said overall plurality of photoemitters 3 may be of a second bigger size and/or be of a second shape. Further additionally, or alternatively to the above, at least a sub-part of the plurality of photoemitters 3 may be capable of emitting a maximum radiation intensity higher than the maximum radiation intensity of a further sub-part of the plurality of photoemitters 3. Here, in one embodiment, at least part of the photoemitters 3 may be made of colored-type LEDs, e.g. RGB-type LEDs; in an embodiment, each of the pixels composing the image 5 may be realized by means of RGB-type LEDs.

Driving Circuits

Referring to FIGS. 2-6, at least one driving circuit 10 can be provided for allowing a proper conditioning of the voltage and/or current directed to the photoemitters 3. It is noted that the driving circuits 10 may become particularly important when the photoemitters 3 are in the form of LED dies, especially low-sized LED dies. In one embodiment, the electro-optical device 1 can be provided with a plurality of driving circuits 10 for the plurality of photoemitters 3. Here, the plurality of driving circuits 10 can preferably be arranged in correspondence to support 2. In the embodiments shown in FIGS. 1-6, the driving circuits 10 can be included within support 2; this can protect the driving circuits 10 against environmental harms. Further, each driving circuit 10 of said plurality of driving circuits 10 can be operatively coupled to, and is configured for feeding, at least a couple, preferably a group of four, photoemitters of said plurality of photoemitters 3. Such technical feature allows still to have small driving circuits 10 without the need of providing a one-to-one configuration for driving circuits and respective photoemitters, and the size of the driving circuits 10, even if controlling four respective photoemitters 3 is not such that to compromise significatively the translucency. 5

In one non-limiting exemplary embodiment, the driving circuits 10 can be integrated circuits. For the purposes of the present disclosure such driving circuits 10 may be considered as "chips" and may include analog and/or digital circuits. Preferably, the electro-optical device 1 of the present disclosure can be configured in such a way to have a plurality of independently feedable and/or controllable driving circuits 10. As shown in FIG. 2, each driving circuit 10 of the plurality of driving circuits 10 can be arranged on a side of said at least one photoemitter of the plurality of photoemitters 3. In the foregoing configuration, radiation visibility is not affected, as typically the radiation of photoemitters 3 is very limited in direction close to a grazing direction with respect to the plane on which they are laid. Thus, said side is arranged on an inclined direction, preferably substantially orthogonal with respect to the first direction D1 of main radiation of at least a photoemitter of said plurality of photoemitters 3. Here, at least part of, preferably all, of the plurality of driving circuits 10 can be arranged in a configuration substantially co-planar with at least part of the, preferably all the, plurality of photoemitters 3.

Still referring to FIGS. 2-6, the electro-optical device 1 of the present disclosure is provided with a plurality of micro-wires 13 for the connection of the plurality of driving circuits 10 with the plurality of photoemitters 3. The plurality of bonding wires 13 can be embedded in support 2 and in particular, as it is apparent from the cross-section drawing of FIG. 2, the wires 13 are embedded within the first coating layer 7. In one embodiment wherein a second coating layer 8 is present, and wherein a double set of photoemitters 3 is present on the first and the second side of the substrate 6, micro-wires 13 may be embedded in the first coating layer and in the second coating layer, respectively for the photoemitters 3 of the first side and of the second side. Further, small-sized driving circuits 10 may have a short latency, i.e. they can be controlled very fast in such a way to allow rapid enablement, activation and deactivation of one or more of the photoemitters 3 electrically connected thereto. Preferably, but in a non-limiting extent, the electro-optical device 1 of the present disclosure can be configured to keep the driving circuits 10 always fed; thus control signals that may be transmitted thereto by means of the data processing unit 4 may be such that to cause a switching of switches, in particular solid-state switches therein contained, to allow activation or deactivation of at least one of the photoemitters 3 electrically connected thereto.

Further, power consumption of small-sized driving circuits 10, in particular of small-sized chip-type driving circuits 10 is in fact limited, and thus keeping them always fed does not contribute significantly to the overall idle consumption of the device. In addition, when the electro-optical device 1 of the present disclosure is so configured, the driving circuit 10 may be controlled in a time-variant way, so that to cause the showing of a moving, i.e. time variant, image 5. Advantageously, using small-sized driving circuits 10, micro-wires 13 and photoemitters 3 in a form of micronized LED dies, allows to obtain a high density of luminous points that can be independently controlled one with respect to the others, without compromising the translucency behavior and at the same time allows to have a high-resolution representation for said image 5.

Phosphors

Referring to FIGS. 2-5, phosphors 9 can be configured to emit radiation within the visible spectrum when excited by means of a radiation lying in a certain wavelength (or frequency) range. In one embodiment, the chemical composition of the phosphors is such that they cause an intensification or exaltation of a radiation in the visible spectrum, in particular within a specified color domain. Preferably, the chemical composition of the phosphors 9 is such to allow an intensification or exaltation of a radiation of the colors substantially lying within the yellow range, or red range, or orange range. Here, for the purposes of the present disclosure, red colors can have a wavelength substantially within the range 625-740 nm. For the purposes of the present disclosure, orange colors can have a wavelength substantially within the range 595-625 nm. For the purposes of the present disclosure, yellow colors can have a wavelength substantially within the range 550-595 nm. In one embodiment, the phosphors 9 may have a chemical composition such that when they are excited with a radiation having a color substantially blue or violet or lying within the ultraviolet spectrum, they emit photons whose frequency or wavelength is, thus radiate with a radiation lying, within the visible spectrum. In such cases, the phosphors may be considered as "transformers" or "translators" of radiation frequency or wavelength from the ultraviolet domain to the visible domain. Here, it shall be noted that in certain embodiments of the electro-optical device 1 of the present disclosure phosphors 9 may not be present.

Referring to FIG. 2, the phosphor layer 9 is shown substantially superimposed on said plurality of photoemitters 3, preferably being superimposed to said plurality of photoemitters 3 along at least a first main direction of radiation D1 of at least one photoemitter of said plurality of photoemitters 3. More specifically, the phosphor layer 9 is shown arranged between said first coating layer 7 and said second coating layer 8, and said plurality of photoemitters 3 embedded into said phosphor layer 9. This technical feature can provide constant or continuous optical radiation due to the properties of the phosphor layer 9. Nothing in the present description shall be considered limiting in the sense of having a continuous, i.e. uninterrupted, layer of phosphor. While such technical solution shall not be considered excluded from the teaching of the present disclosure, preferably, and as clearly visible from the cross-section of FIG. 2, said phosphor layer 9 can be a discontinuous layer.

FIG. 5 illustrates one embodiment wherein the phosphor layer 9 defines a plurality of isles; each isle embeds a respective photoemitter of said plurality of photoemitters 3. Here, the phosphor layer 9 may extend between said first coating layer 7 and said second coating layer 8 and more in particular the isles may extend in the first coating layer 7 or in the second coating layer 8 or in both, according to the specific configuration of the photoemitters 3. Further, a base surface of the phosphor layer 9, and in particular of the isles, lies on a surface of said substrate 6 and said first coating layer 7 or between said substrate 6 and said second coating layer 8. Preferably, albeit in a non-limiting extent, the driving circuits 10 may not be covered by the phosphor layer 9, such that during the manufacturing process they may be deposited, e.g. dropped, on each LED die before the coating layer (first, or second according to the specific configuration) is applied onto the assembly comprising the substrate 6, LEDs, micro-wires 13, driving circuits 10, e.g. by means of molding and/or curing. In a preferred, but non-limiting embodiment, the phosphor layer 9 can be deposited in a liquid form, and then subsequently solidified by means of a known technique. In another non-limiting embodiment, the phosphors may be solidified via curing.

Referring to FIGS. 2-5, the phosphor layer 9 may be configured in such a way to cause a scattering or an at least partial reflection of the optical radiation back to the substrate 6 in such a way to determine a radiation on at least two opposite sides of the device 1, and in particular through the substrate. The foregoing can allow the flame that is represented through the photoemitters 3 to be seen from two opposite sides of the device. Thus, in one embodiment, a part of the optical radiation power of the photoemitters 3 can be directed in a direction coherent with the main direction of radiation of the photoemitters 3 and at least a further part of the optical radiation power of the photoemitters 3 is directed in a direction substantially orthogonal with said main direction of radiation of the photoemitters 3.

Photoemitter Configurations

Referring to FIG. 6, one non-limiting exemplary embodiment for a method of controlling the activation of the plurality of photoemitters will be disclosed. In such embodiment, the driving circuit 10 is operatively coupled with a plurality of respective photoemitters 3. In particular, each of the driving circuits 10 that are part of the device 1 can control a respective group of four photoemitters 3. In general terms, the present disclosure refers to an electro-optical device 1, having a support 2 configured for operatively supporting a plurality of photoemitters 3; a plurality of photoemitters 3 arranged on said support 2 in a predefined and reciprocal spatial configuration, said plurality of photoemitters 3 being arranged in a plurality of groups; a plurality of driving circuits 10, each driving circuit 10 of said plurality of driving circuits 10 being operatively connected to, and controlling at least an activation or deactivation of, a respective group of photoemitters 3; and a data processing unit 4 operatively connected to each of said plurality of driving circuits 10. In particular, the plurality of photoemitters 3 can be arranged in a matrix or grid pattern. In other embodiment, the matrix may be also provided by a plurality of photoemitters 3 that are not necessarily arranged in rows and columns; such spatial configuration may be preferable. In one embodiment, all the columns of the grid or matrix are parallel to one another and they are orthogonal to the lines of the matrix.

Still referring to FIG. 6, in the present embodiment, the data processing unit 4 is configured to receive and/or process an addressing string $S(D_i; F_{j,k}, F_{j,k} \ldots)$ at least to activate or deactivate a part of said plurality of photoemitters 3 and the addressing string $S(D_i; F_{j,k}, F_{j,k} \ldots)$ which can include a first part $D_i$ univocally identifying a specific $D_i$-th driving circuit 10 of said plurality of driving circuits 10; a second part $F_{j,k}, F_{j,k} \ldots$, comprising at least one univocal identifier $F_{j,k}$ of a specific $F_j$-th photoemitter 3 of said plurality of photoemitters 3. Here, the data processing unit 4 can be configured to enable or activate at least one specific driving circuit 10 by means of said first part $D_i$ of said addressing string $S(D_i; F_{j,k}, F_{j,k} \ldots)$, and activate or deactivate at least one specific photoemitter 3 of the group of photoemitters 3 connected to said specific $D_i$-th driving circuit 10 by means of said second part $F_{j,k}, F_{j,k} \ldots$. Further, optionally, a plurality of photoemitters of a device 1 can include the steps of receiving and/or processing an addressing string $S(D_i; F_{j,k}, F_{j,k} \ldots)$ configured to cause at least an activation or deactivation of at least a part of said plurality of photoemitters 3, on/by a data processing unit 4, the addressing string $S(D_i; F_{j,k}, F_{j,k} \ldots)$ including a first part $D_i$ univocally identifying a specific $D_i$-th driving circuit 10 of said plurality of driving circuits 10; a second part $F_{j,k}, F_{j,k} \ldots$, comprising at least one univocal identifier $F_{j,k}$ of a specific $F_j$-th photoemitter 3 of said plurality of photoemitters 3, by means of said data processing unit 4, enabling or activating at least one specific driving circuit 10 by means of said first part $D_i$ of said addressing string $S(D_i; F_{j,k}, F_{j,k} \ldots)$, and by means of said data processing unit 4, activating or deactivating at least one specific photoemitter 3 of the group of photoemitters 3 connected to said specific $D_i$-th driving circuit 10 by means of said second part $F_{j,k}, F_{j,k} \ldots$.

For the purposes of the present disclosure, a driving circuit D is identified by a respective value/number "i", thus becoming the $D_i$-th driving circuit 10. Given an overall number N of driving circuits 10 in the photoelectric device 1, then we have a plurality of $D_i$ driving circuits with $i=1 \ldots N$. In addition, for the purposes of the present disclosure, given that each driving circuit controls a group of four photo emitters 3, each photoemitter of the group is a $F_j$-th photoemitter 3, with $j=1 \ldots 4$. More in general, if we consider that each driving circuit can control a general number M of photoemitters 3, then: $F_j$ photoemitter 3 per each group, with $j=1 \ldots M$, is present. Here, the data processing unit 4 can be configured to address the activation of the photoemitters 3 in order to allow the presentation of the image in the following way. In particular, an addressing string $S(D_i; F_j, F_j, \ldots)$ can include a first part corresponding to the unique identification of the $D_i$-th driving circuit 10; and a second part containing a plurality of identifiers of at least one of the photoemitters of the group of photoemitters 3 controlled by the $D_i$-th driving circuit 10. Here, the second part of the addressing string $S(D_i; F_j, F_j \ldots)$ can contain an overall number of identifiers for photoemitters not exceeding the overall number of the group. In the example of the present disclosure, wherein each driving circuit 10 controls four photoemitters 3, the overall numerosity of elements of the second part of the addressing string $S(D_i; F_j, F_j \ldots)$ may not exceed 4.

Further, when the data processing unit 4 reads a particular addressing string $S(D_i; F_j, F_j \ldots)$, then the system or process first selects the specific $D_i$-th driving circuit 10, and powers it; next, the system or process enables the j-th output of the $D_i$-th driving circuit 10 in such a way to allow the activation of the j-th photoemitter 3 of the group of photoemitters controlled by the $D_i$-th driving circuit 10. In one non-limiting example, let's consider that the second driving circuit 10 of the row at the top of the support 2 is identified by reference number i=2, and that we want the driving circuit 10 to activate only the first photoemitter 3, then the addressing string will be S(2; 1). In another non-limiting example, let's consider that the third driving circuit 10 of the row at the top of the support 2 is identified by reference number i=3, and that we want the driving circuit 10 to activate the first, the second, and the fourth photoemitter 3 of its group, then the addressing string will be S(3; 1, 2, 4).

FIG. 6 illustrates a schematic representation of the three driving circuits 10 each controlling and connected to a respective group of four photoemitters 3. The spatial configuration shown in FIG. 6 shall not be considered as limiting. FIG. 6 helps the reader to immediately recognize that selecting by means of the addressing string a specific driving circuit, can imply selecting a specific group of photoemitters 3. It is herewith noted that each of the photoemitters 3 may be controlled not only in activation or deactivation, thus according to a binary control, but may be controlled (i.e. dimmed) in the intensity of radiation. In one embodiment, the driving circuit 10 may be configured in such a way to allow the control of the intensity of radiation of each of the photoemitters 3 connected thereto. In such an embodiment, the addressing string $S(D_i; F_{j,k}, F_{j,k} \ldots)$ can include a first part corresponding to the unique identification of the $D_i$-th driving circuit 10; and a second part containing a plurality of identifiers of at least one of the photoemitters of the group of photoemitters 3 controlled by the $D_i$-th driving circuit 10. In the latter case, the plurality of identifiers $F_{j,k}$ has a first index j identifying univocally, within each group, the specific photoemitter 3 as disclosed above, and a second index k indicating the level (any among electric power, intensity of radiation, luminance, . . . ) of the j-th photoemitter.

Further, in one embodiment, the second index k may range between 0 and a specific value W. Preferably, but in a non-limiting extent, k=0 corresponds to a photoemitter 3 not emitting any radiation, i.e. de-activated. It is thus apparent that the second part of the addressing string $S(D_i; F_{j,k}, F_{j,k} \ldots)$ may contain at least one, optionally a plurality of, univocal identifiers $F_{j,k}$ of a specific $F_j$-th photoemitter 3 of said plurality of photoemitters 3 containing first data identifying the specific $F_j$-th photoemitter 3; second data identifying a radiation intensity/radiation wavelength for said specific $F_j$-th photoemitter 3. Here, the data processing unit 4 can be configured to carry out a procedure adapting the radiation intensity and/or radiation wavelength for said at least one $F_j$-th photoemitter 3 of said plurality of photoemitters 3 by means of said second data. The second data may be configured to adapt said radiation intensity between a first intensity value I1 and a second intensity value I2, and at least a value between said first intensity value I1 or said second intensity value I2 is different from zero. Alternatively, both the first intensity value I1 and the second intensity value I2 are different from zero. The second data may be configured to adapt said radiation wavelength within at least one between the visible domain, or the infrared domain or ultraviolet domain, or within a range of wavelength overlapping at least part of at least a couple of domains including the visible domain, the infrared domain, the ultraviolet domain. The second data may be in a form of an alphanumeric string including e.g. only binary numbers, or integer decimal numbers, or letters or combination thereof. It is also noted that in the addressing string, the first part may be physically the first part read in the string, and the second part may be physically the second part read following the reading of the first part. In another embodiment, the physical sequence of the first part and of the second part may be inverted.

In addition, appropriate separators may be used to unambiguously allow the data processing unit 4 to distinguish the first part from the second part, and—in the second part—to allow the data processing unit 4 to distinguish the univocal identifiers Fj,k of a specific Fj-th photoemitter 3. Here, as shown in FIG. 6, between the first part and the second part, a first separator item 30, e.g. character, may be provided. Between each univocal identifier Fj,k of a specific Fj-th photoemitter 3 there may be a plurality of second separators 31. In the embodiment herein described, the first separator 30 is ";" and the second separator is ",". However, the foregoing choice is clearly non-limiting. Also, it is noted that in one embodiment, the addressing of the photoemitters 3 to be activated may be carried out by sending to the data processing unit 4 from a memory and then to the driving circuit 10 or the plurality of driving circuits a string of brightness values for a plurality of photoemitters 3, and the address (i.e. the position) of the photoemitter 3 to be activated in the matrix depending on the position of the values in the string. It is thus clear that in an embodiment the addressing string include a plurality of radiation intensity values data having respective positions in said addressing string. The position determines which, among the plurality of photoemitters 3, is activated in such a way to emit an optical radiation with an intensity corresponding to said radiation intensity value data. According, a position of said plurality of radiation intensity value data, in said addressing string corresponds to a specific plurality of photoemitters 3 and/or determines the activation of a specific plurality of photoemitters 3, said specific plurality of photoemitters 3 being univocally associated to said position.

Alternative Embodiments for the Support

In alternative to the chip-on-board embodiments above disclosed, in certain embodiments the electro-optical device 1 of the present disclosure may comprise a so-called PCB configuration, and thus may comprise at least one printed-circuit board. Thus, in this embodiment, said substrate 6 can be a printed board and include a plurality of tracks for feeding electrically said plurality of photoemitters 3. In detail, the printed board may have a substrate 6 which is non-conductive and at least one layer of conductive metal, e.g. copper. Tracks may be made of copper and then may constitute said layer of conductive metal. Also, for the purposes of the present disclosure, tracks may further include pads for connections, vias to pass connections between layers of copper, and features solid conductive areas for electromagnetic shielding or other purposes.

In addition, the printed board may be rigid or flexible. Alternatively or in combination with said features, the printed board may be translucent or completely opaque. Also, the printed board may be covered by means of at least a first coating layer 7 and preferably by means of a first coating layer 7 and a second coating layer 8 which are glass-type layers. Such solution is suitable to appropriately prevent oxidation and exposition of the conductive tracks of the printed board. In such an embodiment, the electro-optical device 1 object of the present disclosure may include a driving circuit 10 for said plurality of photoemitters 3. Typically, the driving circuit 10 in the printed circuit board may be of a greater size with respect to the driving circuits 10 of the chip-on-board solution, and thus in use it is always kept fed. Further, the electro-optical device 1 may include a plurality of switches 12 preferably of a solid-state type, operatively connected to the data processing unit 4 and configured for being selectively activated or deactivated by said data processing unit 4 for allowing the showing of said image 5. Activation or deactivation of the solid-state switches may correspond to a switching between a closed circuit configuration to an open circuit configuration or vice-versa. Here, switches 12 may be controlled actively to cause the showing of the time-variant image 5 as disclosed above. Switching the switches 12 allows it to obtain a sufficiently fast variation between on-states and off states of the photoemitters 3.

In one embodiment, the electro-optical device 1 may include an auxiliary supporting layer, sandwiched between two supports 2. The auxiliary supporting layer may be substantially planar or curved, and/or may have a substantially constant thickness. Preferably, albeit in a non-limiting extent, the auxiliary supporting layer may be electrically insulator. The auxiliary support may define a first side and a second side being opposite one another; on said first side and on said second side there is a respective support 2 carrying the plurality of photoemitters 3 in the form of chip-on-board or in the form of PCB as above described. Preferably, the support 2 is provided with a (single) first coating layer 7. If we imagine to cut the device across an overall width direction, the support 2 being on the first side of the auxiliary support layer may be such that the first coating layer 7 of the first support 2 is arranged on the left, or on the top (depending on the orientation of the device) and the first coating layer 7 of the second support, at the second side, is arranged on the right, or at the bottom, of the device; the overall sequence of layers may be the following: first coating layer 7, substrate 6, auxiliary support layer, substrate 6, second coating layer 8. Further, at least one of the auxiliary support layer and one, or two, of the substrates 6 may be translucent.

Light Bulb

The electro-optical device 1 herein disclosed may be included in a light bulb or as a light bulb device. As shown in FIGS. 1 and 3, the light bulb can be identified by reference number 20. FIG. 3 shows a non-limiting embodiment of a shape for said light bulb 20. Here, the light bulb 20 may be configured to be removably installed on a bulb socket 21 of a lighting device 22, preferably a table-top lamp, such as shown in FIG. 3, or a floor-standing lamp or a lighting fixture (not shown in the figures). Referring to FIG. 3, light bulb 20 can include at least one electro-optical device 1 and, optionally, a power supply stage 24 operatively connected with, and configured to condition an electric feeding voltage or current for, said device 1. The power supply stage 24 may act as a voltage-reducer, rectifier, regulator. In one embodiment, the power supply stage can include an input and an output and be configured to lower a voltage and/or a current between said input and said output and/or for transforming the voltage and the current from AC in input to DC in output. The input of the power supply stage 24 may be connected, in use, to house AC current mains, and the output may be directly connected, albeit by means of the bulb socket 21, to the light bulb 20.

Lighting Device

Referring to the embodiments of FIGS. 1, 3, a lighting device 22 may be preferably configured to be grabbed by a user and/or to be laid on a surface, at least of a table or ground, and/or to be hanged. Here, the lighting device 22 of FIG. 3 and FIG. 1 can each include at least one electro optical device 1, either stand-alone or included in one or more light bulbs 20; the light bulbs may be detachably connected to the lighting device 22. Further, the lighting device 22 of FIG. 1 and FIG. 3 may each be configured in such a way to be directly connected to the house AC current mains. As shown in FIG. 3, the lighting device 22 can include at least one switch 25 electrically connected to said electro-optical device 1 and having an operative configuration of electric supply of said electro-optical device 1 and an operative configuration of electric depowering of said electro-optical device 1. Here, said operative configuration of electric supply and said operative configuration of electric depowering are alternative embodiments. Still referring to the embodiment of FIG. 3, the lighting device 22 of the present disclosure may be battery operated. Thus in one non-limiting exemplary embodiment, lighting device 22 of FIG. 3 may include at least one battery 26 configured to provide electric power to said electro-optical device 1. Here, the at least one battery 26 can be operatively connected to said switch 25, and the switch 25 can be operatively disposed between the at least one battery 26 and the at least one electro-optical device 1. Preferably, the at least one battery 26 is a rechargeable battery. Additionally, or alternatively, the lighting device 22 of FIG. 1 or FIG. 3 may include at least one feeding socket 27, electrically connected to the at least one battery 26 with an electric energy coming from an outer power source removably connected to the feeding socket 27. The feeding socket 27 may be a USB-type socket or any other common socket suitable for the scope.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. An electro-optical device for displaying a fire flame, comprising:
- a housing comprising a flat top surface and a flat bottom surface, wherein the housing is at least partially transparent;
- a plurality of photoemitters arranged and disposed within the housing in a grid or matrix configuration on a substrate comprised of a printed circuit board, wherein the housing is at least partially transparent and encapsulates the substrate;
- a first phosphor layer disposed on a first side of the substrate and covering at least one of the plurality of photoemitters and a second phosphor later disposed on a second opposing side of the substrate; and
- a controller in communication with the plurality of photoemitters, wherein the controller is configured to transmit a control signal to at least a first portion of the photoemitters in order to cause the display of the fire flame.

2. The electro-optical device of claim 1, wherein each of the plurality of photoemitters comprise at least the first phosphor layer, wherein the first phosphor layer is disposed within the housing.

3. The electro-optical device of claim 1, wherein the plurality of photoemitters are each comprised of at least one semiconductor photoemitter.

4. The electro-optical device of claim 1, wherein the plurality of photoemitters are each comprised of a light emitting diode (LED).

5. The electro-optical device of claim 1, wherein the housing is comprised of a first layer integrated with and in contact with the substrate disposed within the housing, and wherein the first layer is at least partially transparent.

6. The electro-optical device of claim 5, wherein the housing is further comprised of a second layer integrated with an in contact with the substrate, wherein there second layer is at least partially transparent.

7. The electro-optical device of claim 6, wherein the first layer is disposed on a first side of the substrate and the second layer is disposed on a second opposing side of the substrate.

8. The electro-optical device of claim 1, further comprising a plurality of circuits disposed within the housing and adapted to activate or de-activate one or more of the plurality of photoemitters.

9. The electro-optical device of claim 8, wherein the plurality circuits are adapted to feed power or an electrical signal to at least a group of four photoemitters.

10. The electro-optical device of claim 8, wherein the each of the plurality of circuits are disposed on one side of each of the plurality of photoemitters, and wherein each of the plurality of circuits are co-planar with respect to each of the photoemitters.

11. The electro-optical device of claim 8, wherein the controller is adapted to receive and process an address string to activate or deactivate one or more of the plurality of photoemitters.

12. The electro-optical device of claim 11, wherein the address string comprises:

a first part identifying a first circuit from the plurality of circuits; and a second part comprising at least one identifier of a first photoemitter of the plurality of photoemitters, and wherein the controller is configured to enable or activate the first circuit via the first part of the address string, and activate or deactivate the first photoemitter of the plurality of photoemitters connected to the first circuit via the second part.

13. The electro-optical device of claim 2, wherein the first phosphor is substantially superimposed on each of the plurality of photoemitters along at least a first main direction of radiation of at least one photoemitter of the plurality of photoemitters.

14. The electro-optical device of claim 2, wherein the first or second phosphor layer is a discontinuous layer and defines a plurality of independent isles embedding a respective photoemitter of the plurality of photoemitters and wherein the first phosphor layer extends into a first layer or a second layer of the housing.

15. The electro-optical device of claim 5, wherein the printed board comprises a plurality of tracks or channels for electrically feeding the plurality of photoemitters, and wherein the device further comprises a plurality of switches operatively connected to the controller and adapted to selectively activate or deactivate in order to display the fire flame via the plurality of photoemitters.

16. The electro-optical device of claim 1, wherein the controller is configured to display a time-variant moving image of the fire flame, wherein a control signal from the controller causes an activation or deactivation of a plurality of switches of one or more driving circuits in a time-variant way for a showing of the time-variant moving image of the fire flame.

17. The electro-optical device of claim 1, wherein the controller is adapted to control a radiation intensity of the plurality of photoemitters.

18. The electro-optical device of claim 1, wherein the housing is disposed within a light bulb comprising an electrical socket adapted to receive electrical power.

19. An electro-optical device for displaying a moving candle flame, comprising:

a casing having a substantially flat top surface and a substantially flat bottom surface, wherein the casing is at least partially translucid;

a plurality of light-emitting diodes (LEDs) arranged and disposed within the casing in a grid or matrix configuration and coupled to a substantially flat substrate, wherein the casing encapsulates the substrate; and a control unit in communication with the plurality of LEDs, wherein the control unit is configured to transmit a control signal to active or deactivate the plurality of LEDs such that a moving candle flame is displayed within the casing.

20. An electro-optical device for displaying a moving fire flame, comprising:

a casing, wherein the casing is at least partially translucid;

a plurality of light-emitting diodes (LEDs) arranged and disposed within the casing in a grid or matrix configuration and coupled to a substrate comprised of a printed circuit board, wherein the casing encapsulates the substrate;

a first phosphor layer disposed on a first side of the substrate and a second phosphor layer disposed on a second opposing side of the substrate; and a control unit in communication with the plurality of LEDs, wherein the control unit is configured to transmit a control signal to active or deactivate the plurality of LEDs such that a moving fire flame is displayed within the casing.

* * * * *